United States Patent
Chaudemanche et al.

(10) Patent No.: US 11,419,343 B2
(45) Date of Patent: Aug. 23, 2022

(54) NON-DAIRY FERMENTED FOOD PRODUCT

(71) Applicant: Sodima, Boulogne-Billancourt (FR)

(72) Inventors: Cyril Chaudemanche, Serpaize (FR); Franck Grattepanche, Chonas l'Amballan (FR); Emilie Lhomme, Sainte-Colombe (FR)

(73) Assignee: Sodima, Boulogne-Billancourt (FR)

( * ) Notice: Subject to any disclaimer, the term of this patent is extended or adjusted under 35 U.S.C. 154(b) by 0 days.

(21) Appl. No.: 16/753,255

(22) PCT Filed: Oct. 3, 2017

(86) PCT No.: PCT/IB2017/001322
§ 371 (c)(1),
(2) Date: Apr. 2, 2020

(87) PCT Pub. No.: WO2019/069111
PCT Pub. Date: Apr. 11, 2019

(65) Prior Publication Data
US 2020/0296982 A1    Sep. 24, 2020

(51) Int. Cl.
*A23C 11/10*    (2021.01)
(52) U.S. Cl.
CPC ......... *A23C 11/106* (2013.01); *A23Y 2220/29* (2013.01); *A23Y 2240/75* (2013.01)
(58) Field of Classification Search
CPC .............. A23C 11/106; A23Y 2220/29; A23Y 2240/75

USPC .......................................................... 426/46
See application file for complete search history.

(56) References Cited

U.S. PATENT DOCUMENTS

| | | | |
|---|---|---|---|
| 2013/0287893 A1 | 10/2013 | Bhowmik et al. | |
| 2016/0262412 A1 | 9/2016 | Pedersen et al. | |
| 2016/0309732 A1 | 10/2016 | Gugger et al. | |
| 2019/0045826 A1* | 2/2019 | Barata ....................... | A23L 9/24 |

FOREIGN PATENT DOCUMENTS

| | | | | |
|---|---|---|---|---|
| CN | 105558068 | | 5/2016 | |
| JP | 59-166035 | | 9/1984 | |
| WO | WO-2017112883 A1 * | | 6/2017 | ........... A23C 9/1322 |
| WO | WO 2017/153669 | | 9/2017 | |
| WO | WO-2017153669 A1 * | | 9/2017 | ................ A23J 3/14 |
| WO | WO 2017/185093 | | 10/2017 | |

OTHER PUBLICATIONS

"Almond & Coconut Milk Yoghurt", http://www.gnpd.com, Jul. 2014.
"Vanilla Flavoured Cultured Almond Milk", http://www.gnpd.com, Oct. 2013.
"Berry Mix Oat Snack Dessert", http://www.gnpd.com, Dec. 2015.

\* cited by examiner

*Primary Examiner* — Brent T O'Hern
(74) *Attorney, Agent, or Firm* — Seckel IP, PLLC

(57) ABSTRACT

The present disclosure relates to non-dairy fermented food products and methods of making non-dairy fermented food products. In particular, methods are disclosed for making non-dairy fermented food products using pea protein and having a desired texture without the use of added stabilizers.

12 Claims, 1 Drawing Sheet

3.6% protein content

12% protein content 3.2% protein content

8% protein content 2.8 % protein content 5.6% protein content 2.4% protein content 4% protein content

NON-DAIRY FERMENTED FOOD PRODUCT

CROSS-REFERENCE TO RELATED APPLICATIONS

This application represents a National stage application of PCT/IB2017/001322, filed Oct. 3, 2017, entitled "Non-Dairy Fermented Food Product", pending. The entire content of this application is incorporated by reference.

TECHNOLOGY

The present disclosure generally relates to non-dairy fermented food products and methods for making non-dairy fermented food products.

BACKGROUND

Fermented food products play an important role in the diets of various cultures around the world. Dairy-based fermented food products, such as yogurt and kefir, are popular foods that are available in many different forms. Dairy-based fermented food products can provide dietary protein and beneficial probiotic bacteria. However, many consumers prefer to avoid eating animal-based foods, including those based on milk ingredients. Non-dairy alternatives to yogurt are available, including yogurts based on soy, almond, and coconut milks. However, the available non-dairy alternatives to yogurt often suffer from poor texture, poor flavor, and/or low protein content. Thus, there is a need for improved non-dairy alternatives to yogurt.

SUMMARY

The invention disclosed herein is based on the discovery that pea protein can be used to make a non-dairy fermented food product containing substantially no added stabilizers and having a desirable texture.

A method of making a non-dairy fermented food product having substantially no added stabilizers is provided.

In some embodiments, the method includes providing a liquid mixture that includes pea protein and sugar, where the liquid mixture has a pea protein content of from about 3% to 12% by weight, heating the liquid mixture to a temperature of from about 65° C. to about 120° C. for sufficient time to produce a thermally treated mixture, inoculating the thermally treated mixture with a lactic acid bacterial culture, and fermenting the thermally treated mixture until a pH of less than about 4.7 is reached to form the fermented food product. In some embodiments, the thermally treated mixture can have an average pea protein particle size of less than 30 μm.

In some embodiments, the method includes providing a liquid mixture that includes pea protein and sugar, where the liquid mixture has a pea protein content of from about 3% to 12% by weight, heating the liquid mixture to a temperature and for a time sufficient to produce an average pea protein particle size of less than 30 μm to produce a thermally treated mixture, inoculating the thermally treated mixture with a lactic acid bacterial culture, and fermenting the thermally treated mixture until a pH of less than about 4.7 is reached to form the fermented food product.

The non-dairy fermented food product can have a viscosity of at least 0.4 Pa*s at 60 s$^{-1}$ at 10° C. and a firmness of at least 40 g at 10° C.

In some embodiments, a method provided herein can further include a homogenization step following the heating step and prior to the inoculating step.

In some embodiments of a method provided herein, the liquid mixture can further include a non-dairy milk product, such as an oat milk product, an almond milk product, or a coconut milk product. In some embodiments, a non-dairy milk product can be included in a liquid mixture in an amount of up to 60% by weight.

In some embodiments of a method provided herein, the liquid mixture can further include sugar in an amount of from 0.5% to 10% by weight.

In some embodiments of a method provided herein, the lactic acid bacterial culture comprises one or more of *Streptococcus thermophilus*, *Lactobacillus delbrueckii bulgaricus*, *Lactobacillus acidophilus*, *Bifidobacterium animalis lactis*, and *Weissella cibaria*. In some embodiments, the lactic acid bacterial culture comprises *Streptococcus thermophilus* and *Lactobacillus delbrueckii bulgaricus*.

In some embodiments of a method provided herein, the liquid mixture can include a fiber ingredient, such as an oat fiber ingredient, in an amount of up to 3% by weight.

In some embodiments of a method provided herein, the liquid mixture can include a fat in an amount of up to 15% by weight.

A non-dairy fermented food product is also provided. The non-dairy fermented food product includes a pea protein in an amount of from about 3% to 12% by weight of the food product, where the pea protein forms a matrix of proteins, sugar in an amount of about 0.5% to about 10% by weight of the food product, and substantially no added stabilizers. A food product can have a viscosity of at least 0.4 Pa*s at 60 s$^{-1}$ at 10° C. and a firmness of at least 40 g at 10° C.

In some embodiments, a non-dairy fermented food product can include a non-dairy milk product, such as an oat milk product, an almond milk product, or a coconut milk product. In some embodiments, a non-dairy milk product can be included in a non-dairy fermented food product in an amount of up to about 60% by weight of the food product.

In some embodiments, a non-dairy fermented food product provided herein can include a live and active lactic acid bacterial culture. In some embodiments, a live and active lactic acid bacterial culture can include one or more of *Streptococcus thermophilus*, *Lactobacillus delbrueckii bulgaricus*, *Lactobacillus acidophilus*, *Bifidobacterium animalis lactis*, and *Weissella cibaria*. In some embodiments, a live and active lactic acid bacterial culture can include *Streptococcus thermophilus* and *Lactobacillus delbrueckii bulgaricus*.

In some embodiments, a non-dairy fermented food product provided herein can include a fiber ingredient, such as an oat fiber ingredient, in an amount of up to 3% by weight of the food product.

In some embodiments, a non-dairy fermented food product provided herein can include a fat content of up to 15% by weight of the food product.

These and various other features and advantages will be apparent from a reading of the following detailed description.

DETAILED DESCRIPTION

Figure 1:
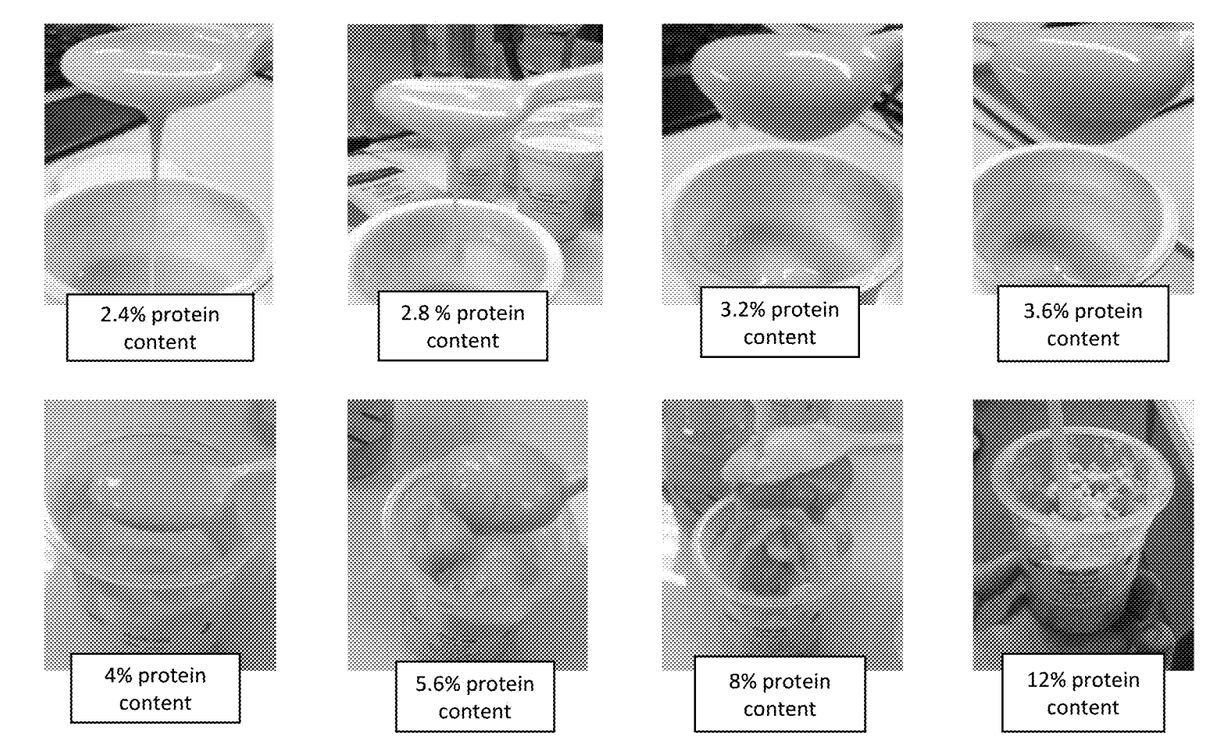
FIG. 1 shows samples of a non-dairy fermented food product containing from about 2.4% pea protein to about 12% pea protein by weight. Gel formation was weak at 2.4%, but resembled a traditional yogurt at from about 2.8% pea protein to about 5.6% pea protein. Samples ranging from about 7% pea protein to about 10% pea protein resembled Greek style yogurt. Samples at about 12% pea protein were lumpy.

While more non-dairy alternatives to yogurt are becoming available, the currently available products have not been able to achieve a balance of good flavor and a desired texture. Indeed, in order to achieve a texture normally associated with milk-based yogurts, non-dairy alternatives include added stabilizers, such as starches, pectins, gums, and/or hydrocolloids. However, consumers increasingly prefer simpler ingredients lists on the products they consume. This presents a challenge for making non-dairy alternatives to yogurt without added stabilizers while also maintaining a good flavor and texture. It has been discovered, and is disclosed herein, that certain methods can be used to make a pea protein-based non-dairy fermented food product that has a desired texture without the use of added stabilizers.

As used herein, the term "added stabilizers" refers to ingredients other than pea protein, sugar, and non-dairy milk that contribute to viscosity. Examples include starches (e.g., tapioca starch, corn starch, rice starch, potato starch, cassava starch, corn flour, and the like), pectins, gums (e.g., locust bean gum, carob bean gum, guar gum, and the like), hydrocolloids (e.g., alginate, agar, and the like), and non-pea proteins (e.g., potato protein, gelatin, and the like). It is to be understood that "added stabilizers" does not include pectins, proteins, starches, or sugars incidentally included from fruit, non-dairy milk, or a pea protein source. A non-dairy fermented food product herein includes substantially no added stabilizers. As used herein, the term "substantially no added stabilizers" indicates that a non-dairy fermented food product provided herein contains no more than trace amounts of an added stabilizer, e.g., less than 0.01% by weight of the non-dairy fermented food product.

A method of making a non-dairy fermented food product having substantially no added stabilizers is provided herein. Methods provided herein surprisingly produce a thick, creamy fermented food product without requiring added stabilizers or dairy ingredients (e.g., milk, milk proteins, or milk fat).

A method provided herein includes providing a liquid mixture that contains pea protein in an amount of from about 3% to about 12% by weight of the liquid mixture, and sugar. A liquid mixture can be made by combining a pea protein with water or other liquid ingredient (e.g., a non-dairy milk), sugar, and other ingredients to the desired pea protein content. In some embodiments, a liquid mixture can be agitated and/or heated (e.g., to a temperature of from about 35° C. to about 60° C., or to about 45° C. to about 55° C.) to solubilize ingredients (e.g., pea protein and/or sugar) in the liquid mixture.

Pea protein in a liquid mixture provided herein contributes to texture (e.g., viscosity and firmness) by providing a protein matrix in a non-dairy fermented food product provided herein. Pea protein can also contribute to a desired protein content of a non-dairy fermented food product provided herein.

A pea protein suitable for use in a liquid mixture can be from any pea species source, though, preferably *Pisum sativum*. A pea protein suitable for use in a liquid mixture can be in the form of, for example, a pea protein concentrate or a pea protein isolate. In some embodiments, a pea protein can be provided in a liquid or powder form having at least 50% (e.g., at least 70%, at least 80%, or at least 90%) pea protein content by weight of the liquid or powder. Various suitable pea proteins are commercially available, including for example, NUTRALYS® F85F (Roquette Freres, Lestrem, France), NUTRALYS® S85F (Roquette Freres, Lestrem, France), Empro E86HV (Emsland Group®, Emlichheim, Germany), PURIS™ Pea 870 (PURIS™, Minneapolis, Minn., USA), PURIS™ Pea 860 (PURIS™, Minneapolis, Minn., USA), Vitassence 1550 (Ingredion, Westchester, Ill., USA), and Pisane (Cosucra, Warcoing, Belgium). In some embodiments, a suitable pea protein can be partially hydrolyzed, but pea proteins with high levels of hydrolyzation (e.g., PURIS™ Pea 870H (PURIS™, Minneapolis, Minn., USA)) may not be suitable for use in a method provided herein.

A sugar in a liquid mixture provided herein provides nutrients to lactic acid bacteria during fermentation. In some embodiments, a sugar can also contribute to sweetness of a non-dairy fermented food product provided herein.

Sugar suitable for use in a liquid mixture can include any sugar source fermentable by a lactic acid bacterial culture. Examples include sucrose (e.g., table sugar, powdered sugar, and the like), honey, syrups (e.g., maple syrup, corn syrup, and the like), or any other fermentable sugar source. Sugar can be included in any amount sufficient to support fermentation of a liquid mixture to a pH of 4.7 or less. Examples of suitable amounts of sugar include from about 0.5% to about 10% (e.g., from about 1% to about 5%, or about 2% to about 4%) by weight of a liquid mixture. In some embodiments, part or all of the sugar included in a liquid mixture can be from additional ingredients included in the mixture (e.g., a non-dairy milk product).

Although a liquid mixture including only pea protein and sugar is sufficient for use in a method provided herein, in some embodiments, additional ingredients can be included in a liquid mixture. Examples of additional ingredients that can be included in a liquid mixture include a non-dairy milk product, a fiber ingredient, and/or a fat.

A non-dairy milk product can be included in a liquid mixture in an amount of up to 60% (e.g., up to 50%, or from about 15% to about 40%) by weight of the liquid mixture. A non-dairy milk product can be from any plant source, such as, without limitation, nuts (e.g., almond, cashew, coconut, and the like), grains (e.g., oat, rice, barley, and the like), legumes (e.g., peanut, soy, lupin, pea, and the like), seeds (e.g., chia seed, flaxseed, sesame seed, sunflower seed, hemp seed, and the like), or any combination thereof. A non-dairy milk product can contribute to flavor and/or nutritional content of a non-dairy fermented food product provided herein.

A fiber ingredient can be included in a liquid mixture in an amount of up to 5% (e.g., up to about 3%, or from about 1% to about 3%) by weight of the liquid mixture. A fiber ingredient can be from any plant source, such as, without limitation, oat, wheat, chicory, corn, sugar cane, and the like, or mixtures thereof. A fiber ingredient can contribute to texture (e.g., viscosity and/or firmness) of a non-dairy fermented food product provided herein. A fiber ingredient can also contribute to dietary fiber when consumed.

A fat can be included in a liquid mixture in an amount of up to 15% (e.g., up to about 10%, or from about 1% to about 9%) by weight of the liquid mixture. A fat can be any edible fat, including, without limitation, vegetable oils, such as coconut oil, palm oil, soy oil, canola oil, fractions and/or modifications thereof, and the like, and combinations thereof. Though it is preferred that ingredients in a fermented non-dairy food product provided herein be vegetarian, in some embodiments, a fat can be a dairy fat. A fat can contribute to texture (e.g., viscosity and/or firmness) of a non-dairy fermented food product provided herein. A fat can also contribute to flavor and/or nutritional content of a non-dairy fermented food product provided herein.

Other ingredients suitable for use in a liquid mixture can include, for example, minerals (e.g., calcium, magnesium, and the like), non-heat sensitive vitamins, and other ingredients that would not be destroyed by heat treatment described below.

In some embodiments, a liquid mixture can be homogenized. Homogenization can be performed on a liquid mixture using any appropriate technique. Homogenization is typically performed using pressures of from about 100 bar to about 250 bar (about 10 MPa to about 25 MPa).

A liquid mixture provided herein is heated to produce a thermally treated mixture. A liquid mixture can be heated at a temperature of from about 65° C. to about 120° C. for at least 30 seconds (e.g., from about 1 minute to about 30 minutes, or from about 2 minutes to about 15 minutes) to produce a thermally treated mixture. Time and temperature used to produce a thermally treated mixture is selected to result in a non-dairy food product having a viscosity of at least 0.4 Pa*s at $60^{-1}$ at 10° C. and a firmness of at least 40 g at 10° C. following fermentation of the thermally treated mixture by lactic acid bacteria. In some embodiments, a liquid mixture can be heated to a temperature of from about 90° C. to about 120° C. for at least 30 seconds to produce a thermally treated mixture. In some embodiments, a liquid mixture can be homogenized after heating, and heated at a temperature of from about 65° C. to about 120° C. for at least 30 seconds to achieve a viscosity of at least 0.4 Pa*s (e.g., at least 0.5 Pa*s, or at least 0.6 Pa*s) at $60^{-1}$ at 10° C. and a firmness of at least 40 g (e.g., at least 50 g, at least 70 g, or at least 90 g) at 10° C. following fermentation by lactic acid bacteria. Similar to pasteurization, a lower temperature heat treatment over a long period of time can achieve similar results in texture to a higher temperature heat treatment over a shorter period of time.

To measure viscosity of a fermented food product, about 30 g of sample of the fermented food product is subjected to a viscosity test at 1 day post fermentation. First, the sample of the fermented food product is stored at a temperature of 10° C. for a minimum of 2 hours prior to measurement. Then, the sample is gently stirred in a circular motion 3 times before transferring to a standard cylindrical sample holder of a Physica MCR 101 rheometer (Anton Paar GmbH, Graz, Austria). Viscosity is measured using RheoPlus software (Anton Paar GmbH, Graz, Austria) in terms of Pa*s at $60^{-1}$ at 10° C.

To measure firmness of a fermented food product, a 125 g sample of the fermented food product is subjected to a firmness test. First, the sample of the fermented food product is stored in a 125 g cup container at a temperature of 10° C. for a minimum of 2 hours prior to measurement. Then, the sample in the container is placed on the base of a TA.XTplus texture analyzer (Stable Micro Systems, Surrey, United Kingdom) fitted with a 35 mm disk probe, and programmed using Exponent software (Stable Micro Systems, Surrey, United Kingdom) with the following settings:

| Test mode | Compression (cycle until count) | |
| --- | --- | --- |
| Pre Test Speed | 10 | mm/sec |
| Test Speed | 10 | mm/sec |
| Post Test Speed | 10 | mm/sec |

-continued

| Test mode | Compression (cycle until count) | |
| --- | --- | --- |
| Target Mode | Distance | |
| Force | 100 | g |
| Distance | 30 | mm |
| Strain | 10 | % |
| Count | 2 | |
| Trigger Type | Auto (Force) | |
| Trigger Force | 5 | g |
| Trigger Distance | 2 | mm |
| Break Mode | Off | |
| Break Sensitivity | 10 | g |
| Break Detect | Stop | |
| Stop Plot at | Start Position | |
| Tare Mode | Auto (Force) | |

Firmness is measured as the maximum force value in grams (g) on the second peak of the curve. Care should be taken during measurement to obtain the measurement as quickly as possible to prevent significant changes in temperature of the sample.

In some embodiments, a liquid mixture can be heated for sufficient time and temperature to achieve a pea protein particle size of less than 30 μm (e.g., about 25 μm or less, or about 20 μm or less) to produce a thermally treated mixture. Pea protein particle size of a thermally treated mixture is measured within 24 hours of production of the thermally treated mixture as volume mean diameter (D[4,3]) using a Malvern Mastersizer 3000™ (Malvern Instruments Ltd, Malvern, United Kingdom) according to the manufacturer's instructions. Briefly, a 2 ml sample of a thermally treated mixture is placed into a clean dispersion unit in a Malvern Mastersizer 3000™ with a dispersion unit filled with distilled water and stirring at 1800 rpm. If the sample contains no fat, the sample can be placed directly into the dispersion unit without the addition of sodium dodecyl sulfate (SDS). If the sample contains fat, 5 drops of an SDS solution at a concentration of at least 0.5% are added to the sample prior to placing the sample in the dispersion unit. The average particle size is measured using Mastersizer software set with the following parameters:

| Parameter | Setting |
| --- | --- |
| Manual stirrer speed to incorporate the product | 1800 RPM |
| Type of particles | Spherical |
| Refraction index of particles | 1.458 |
| Absorption index | 0.001 |
| Dispersing media refraction index (water) | 1.33 |
| Number of measurements per analysis | 3 |
| Acquisition of baseline | 10 sec |
| Obscuration | 3 to 10% |
| Mie theory used to recalculate diameter | |

In some embodiments, a liquid mixture can be heated for sufficient time and temperature to reduce microbial content in the liquid mixture. For example, in some embodiments, a liquid mixture can be heated at a temperature and time sufficient to result in a greater than a 4 log reduction (e.g., at least a 5 log, or at least a 6 log reduction) in *S. aureus*, *E. coli*, *L. monocytogenes*, and/or *Salmonella*.

A thermally treated mixture is inoculated with a lactic acid bacterial culture. Any lactic acid bacterial culture can be used that includes one or more lactic acid bacteria species that can ferment a thermally treated mixture provided herein to a pH of less than about 4.7. Examples of useful lactic acid bacteria species include, without limitation, *Streptococcus thermophilus, Lactobacillus delbrueckii bulgaricus, Lactobacillus acidophilus, Bifidobacterium animalis lactis, Weissella cibaria*, and any combinations thereof. In some embodiments, a combination of *Streptococcus thermophilus, Lactobacillus delbrueckii bulgaricus* can be included in a lactic acid bacterial culture, with or without additional lactic acid bacteria species, to ferment a thermally treated mixture provided herein.

In some embodiments, a lactic acid bacteria culture can be selected for a desired attribute, such as fermentation rate, preferred fermentation temperature, ability to reach a final pH (e.g., less than about 4.7, or less than about 4.6) contribution to texture of the final fermented product (e.g., firmness, viscosity, smoothness, and/or creaminess), contribution to flavor of the final fermented product, and/or contribution to appearance of the final fermented product. In some embodiments, a lactic acid bacteria culture can be selected to achieve a pH of 4.7 or less in a time of less than 24 hours (e.g., less than 12 hours, or 8 hours or less, or 6 hours or less).

A thermally treated mixture is fermented to achieve a viscosity of at least 0.4 Pa*s (e.g., at least 0.5 Pa*s, or at least 0.6 Pa*s) at $60^{-1}$ at 10° C. and a firmness of at least 40 g (e.g., at least 50 g, at least 70 g, or at least 90 g) at 10° C., which typically occurs at about pH 4.7 or less. In some embodiments, fermentation is allowed to continue to a pH of less than about 4.6 (e.g., a pH of about 4.55).

Fermentation can be performed using any appropriate conditions. For example, fermentation can be performed at a temperature range of from about 35° C. to about 50° C. (e.g., at about 35° C. to about 45° C., or at about 40° C., or at about 43° C.), as appropriate for the selected lactic acid bacteria culture. In another example, fermentation can be performed in a large container and later portioned into packaging suitable for sale, or can be performed in packaging suitable for sale. Fermentation can be slowed or stopped using any appropriate method (e.g., by cooling the fermented food product to a temperature of less than about 30° C. using, for example, a heat plate exchanger.). In some embodiments, a non-dairy fermented food product can be filtered after fermentation. For example, a non-dairy fermented food product can be passed through a mesh filter (e.g., 300 µm to 500 µm mesh).

In some embodiments, a non-dairy fermented food product can be combined with additional ingredients, such as fruit and/or vegetables (e.g., whole fruit and/or vegetables, fruit and/or vegetable pieces, fruit and/or vegetable puree, fruit and/or vegetable juice, fruit and/or vegetable preparations, and the like) or flavorants/colorants (e.g., sweeteners, or fruit and/or vegetable puree, juice, chocolate, spices, coconut, extracts, and the like) to provide a desired flavor and/or appearance. In some embodiments, ingredients that provide a desired flavor and/or appearance can be mixed into a non-dairy fermented food product, or can be included in packaging without mixing with the non-dairy fermented food product (e.g., "fruit-on-the-bottom").

A non-dairy fermented food product can be packaged in any appropriate packaging suitable for storage and/or sale of the product. Examples include, without limitation, multi-serving containers (e.g., cartons or bags), individual-serving plastic cups, glass containers, and flexible tubes.

In some embodiments, a non-dairy fermented food product provided herein can be packaged without killing the lactic acid bacteria culture used to ferment the product, so as to include live and active lactic acid bacteria. In some embodiments, a non-dairy fermented food product provided herein can be heated to kill bacteria in the food product, so that the product can be stored at temperatures above refrigeration temperatures without spoiling.

A non-dairy fermented food product can be packaged alone, or with additional ingredients. For example, a non-dairy fermented food product can be packaged with an ingredient, such as a grain ingredient (e.g., rolled oats, granola, and the like), a seed ingredient (e.g., chia seeds, sunflower seeds, and the like), a nut (e.g., coconut, almond, and the like), or other ingredient (e.g., a sauce, peanuts, a sweetener, and the like), either combined with the non-dairy fermented food ingredient, or in a separate part of the packaging as a kit to be consumed as desired by the consumer.

A non-dairy fermented food product provided herein can be stored at refrigeration temperatures (e.g., above freezing to about 10° C., or about 4° C. to about 10° C.) for at least 10 days (e.g., at least 20 days or at least 30 days). In some embodiments, where a non-dairy fermented food product has been treated (e.g., heated) to kill lactic acid bacteria, the non-dairy fermented food product can be stored at temperatures above refrigeration temperatures (e.g., about 15° C. to about 40° C., or about 20° C. to about 35° C.) for at least 30 days (e.g., at least 60 days, or at least 90 days).

The following examples describe embodiments of the present invention.

EXAMPLES

Example 1—Effects of Treatment Temperature on Fermented Base

NUTRALYS® F85F (Roquette Freres, Lestrem, France) was diluted in hot water (about 50° C.), and combined with sucrose to produce a mixture containing 5% NUTRALYS® F85F (corresponding to a 4% pea protein concentration) and 3% sucrose. The mixture was heated for 15 minutes at 60° C., 70° C., 80° C., 90° C., 100° C., 110° C., or 120° C. to form thermally treated mixtures. The thermally treated mixtures were cooled to 43° C., then fermented at 43° C. with a dairy-isolated lactic acid bacteria culture containing *Streptococcus thermophilus* and *Lactobacillus bulgaricus* (Yo-Mix 433, Danisco A/S, Copenhagen, Denmark) to pH 4.55 to form non-dairy fermented food products. It was noted that samples that were either heat treated without fermentation or fermented without heat treatment did not form a gel.

Each of the resulting non-dairy fermented food products was visually observed for texture, and the firmness and viscosity were measured at 10° C. as described above.

Table 1 provides texture observations, average firmness, and average viscosity for each resulting non-dairy fermented food product.

TABLE 1

| Thermal treatment temp (° C.) | Observations | Firmness (Force in g) | Viscosity (Pa*s at $60^{-1}$) |
|---|---|---|---|
| 60 | Liquid | 27.8 | 0.25 |
| 70 | Lumpy | 29.1 | 0.27 |
| 80 | Lumpy | 39.2 | 0.38 |
| 90 | Weak gel | 60.2 | 0.69 |
| 100 | Smooth, strong gel texture | 84.3 | 0.74 |
| 110 | Smooth, strong gel texture | 83.9 | 0.82 |
| 120 | Smooth, strong gel texture | 72.3 | 0.78 |

Thixotropy testing was performed on the samples 1 day following fermentation to determine the ability of the gel to recover, or lose viscosity, under shear. Thixotropy was performed using the cone plate geometry on an MCR 702 rheometer (Anton Paar GmbH) with RheoCompass™ version 1.18 software (Anton Paar GmbH) set to the following parameters:

| Parameter | Setting |
| --- | --- |
| Configuration | MCR 702 with one drive |
| True strain & True gap | On |
| Measurement cell | P-PTD 200 + H-PTD200 |
| Measurement system | PP50/P3 |
| Gap | 1 mm |
| Mode | Shear rheology |

Samples treated at 60° C. to 80° C. had a loss of viscosity of about 90%, while samples treated at higher temperatures had reduced loss in viscosity (90° C. about 85%, 100° C. and 110° C. about 80%, and 120° C. about 77%). This suggests that samples treated at temperatures above 80° C. have a more stable gel structure.

Particle size of each thermally treated mixture was measured as described above prior to fermentation. Average particle size increased from about 26.4 µm to about 50 µm with an increase of heat treatment from 25° C. (untreated) to 80° C. Additional increases in temperature during heat treatment resulted in a reduction of average particle size to less than 30 µm, including values less than 25 µm at temperatures from 90° C. to 120° C. Without being bound to theory, it is believed that temperatures exceeding 80° C. result in denaturation of pea proteins. It is noted that similar patterns in pea protein particle size were observed with NUTRALYS® F85F and Empro E86HV, suggesting that different pea protein sources behave in a similar manner with regard to pea protein particle size with heat treatment.

pH over time during fermentation was measured for each sample. All samples, including a sample that was not heat treated, reached a pH of 5.0 or less within 12 hours. However, fermentation time was reduced with heat treatment at temperatures greater than 90° C., reaching a pH of 4.5 or less within about 10 hours.

Water holding capacity (WHC %) was performed on the samples in Table 1 to determine the ability of the gel to resist syneresis. Water holding capacity was measured by centrifugation. Briefly, 20 g samples were placed in centrifuge tubes. The tubes were centrifuged at 20° C. for 15 minutes at 15000*g. Then, the water holding capacity was calculated based on the following formula:

$$WHC\ \% = \left(1 - \frac{\text{Weight of whey after centrifuge}}{\text{Weight of the yogurt sample}}\right) \times 100$$

Water holding capacity increased with increasing treatment temperature up to about 90° C. (from about 23.5% with 60° C. heat treatment to about 28% with 90° C. heat treatment), and remained steady at about 28% to about 30% with heat treatment temperatures from 90° C. to 120° C.

Colorimetry was performed on the samples in Table 1 to assess visual attributes. Colorimetry was performed using a calibrated Minolta CM3500d spectrophotometer (Konica Minolta Inc., Tokyo, Japan). In addition, a standard dairy yogurt sample was measured. Briefly, samples were placed in cups, with care to make sure that the surface of each sample is evenly spread across the entire cup surface. The cups were placed on the measuring platform of the instrument and measured for L* (black to white), a* (red to green), and b* (yellow to blue). Table 2 shows the colorimetry results. ΔE is a calculated comparison to the sample treated at 120° C. (control), based on the following formula:

$$\Delta E = \sqrt{\begin{array}{l}(L*\text{sample} - L*\text{control})^2 + \\ (a*\text{sample} - a*\text{control})^2 + \\ (b*\text{sample} - b*\text{control})^2\end{array}}$$

TABLE 2

| Thermal treatment temp (° C.) | L* (D65) | a* (D65) | b* (D65) | ΔE |
| --- | --- | --- | --- | --- |
| 120 | 78.05 | 1.09 | 10.85 | 0 |
| 60 | 78.77 | 2.44 | 12.39 | 2.17 |
| 70 | 78.81 | 2.46 | 12.15 | 2.04 |
| 80 | 79.6 | 2.39 | 11.61 | 2.16 |
| 90 | 80.2 | 2.38 | 12.41 | 2.95 |
| 100 | 80.07 | 2.03 | 12.8 | 2.96 |
| 110 | 79.17 | 1.52 | 12.08 | 1.72 |
| Dairy yogurt | 91.36 | −1.73 | 12.2 | 13.67 |

Brightness (L* value) and range from yellow to blue (b* value) is similar for all of the non-dairy fermented samples. However, as heat treatment temperature increases, the a* value decreases, indicating a reduction in red. Also, although the brightness value (L* value) for all of the non-dairy fermented samples was lower than the dairy yogurt standard, the non-dairy fermented samples were perceived as shiny.

Example 2—Effects of Pea Protein Concentration on Fermented Base

NUTRALYS® F85F was diluted in hot water (about 50° C.), and combined with sucrose to produce mixtures containing 3%, 5%, 7%, 10%, and 15% NUTRALYS® F85F (corresponding to 2.6%, 4%. 5.6%, 8%, and 12% pea protein concentrations, respectively) and 3% sucrose. The mixtures were heated for 15 minutes at 110° C. to form thermally treated mixtures. The thermally treated mixtures were cooled to 43° C., then fermented at 43° C. with Yo-Mix 433 to pH 4.55 (about 5 hours 30 minutes) to form non-dairy fermented food products. After stirring, the non-dairy fermented food products were stored at 4° C. for one day before visual observation. Table 3 shows the visual observations.

TABLE 3

| Pea protein concentration (%) | Observations |
| --- | --- |
| 2.6 | Gel similar to standard yogurt |
| 4 | Gel similar to standard yogurt |
| 5.6 | Gel similar to Greek-style yogurt |
| 8 | Gel similar to Greek-style yogurt |
| 12 | Lumpy |

NUTRALYS® F85F was diluted in hot water (about 50° C.), and combined with sucrose to produce mixtures containing 3%, 3.5%, 4%, 4.5%, and 5% NUTRALYS® F85F (corresponding to 2.4%, 2.8%. 3.2%, 3.6%, and 4% pea protein concentrations, respectively) and 3% sucrose. The mixtures were heated for 15 minutes at 110° C. to form thermally treated mixtures. The thermally treated mixtures were cooled to 43° C., then fermented at 43° C. with Yo-Mix 433 to pH 4.55 (about 5 hours 30 minutes) to form non-dairy fermented food products. After stirring, the non-dairy fermented food products were stored at 4° C. for one day before measuring firmness and viscosity at 10° C. as described above, as shown in Table 4.

TABLE 4

| Pea protein concentration (%) | Firmness (Force in g) | Viscosity (Pa*s at 60$^{-1}$) |
| --- | --- | --- |
| 2.4 | 25.3 | 0.17 |
| 2.6 | 33 | 0.25 |
| 3.2 | 48.4 | 0.41 |
| 3.6 | 70.1 | 0.54 |
| 4 | 99.3 | 0.81 |

Example 3—Effects of pH on Fermented Base

NUTRALYS® F85F was diluted in hot water (about 50° C.), and combined with sucrose to produce mixtures containing 5% NUTRALYS® F85F (corresponding to 4% pea protein concentration) and 3% sucrose. The mixture was heated for 15 minutes at 110° C. to form a thermally treated mixture. The thermally treated mixture was cooled to 43° C., then fermented at 43° C. with Yo-Mix 433. Samples were obtained at pH 5.4, 5.2, 5.1, 5.0, 4.9, 4.8, 4.7, and 4.55 to observe the impact of pH on firmness and viscosity. The results show that, at about pH 5.2, a desired firmness and viscosity are achieved. Tasting of the products indicated that a cohesive gel was formed at about pH 4.7 or less. Table 5 shows the firmness and viscosity results.

TABLE 5

| pH | Firmness (Force in g) | Viscosity (Pa*s at 60$^{-1}$) |
| --- | --- | --- |
| 5.4 | 48.6 | 0.31 |
| 5.2 | 57.4 | 0.46 |
| 5.1 | 70.2 | 0.57 |
| 5.0 | 55.7 | 0.58 |
| 4.9 | 61.2 | 0.62 |
| 4.8 | 67.9 | 0.57 |
| 4.7 | 76.3 | 0.72 |
| 4.55 | 73.0 | 0.68 |

Example 4—Effects of Homogenization on Fermented Base

NUTRALYS® F85F was diluted in hot water (about 50° C.), and combined with sucrose to produce mixtures containing 5% NUTRALYS® F85F (corresponding to 4% pea protein concentration) and 3% sucrose. Samples of the mixture were treated as indicated in Table 6 to form thermally treated mixtures. The thermally treated mixtures were fermented at 43° C. with Yo-Mix 433.

TABLE 6

| Sample | Heat treatment before homogenization | Homogenization (bars) | Heat treatment after homogenization |
| --- | --- | --- | --- |
| 1 | 70° C., 15 minutes | None | None |
| 2 | 70° C., 15 minutes | 100 | None |
| 3 | 70° C., 15 minutes | 250 | None |
| 4 | 110° C., 15 minutes | None | None |
| 5 | 110° C., 15 minutes | 250 | None |
| 6 | 70° C., 15 minutes | 250 | 110° C., 15 minutes |

Table 7 shows the results of firmness and viscosity measurements on the samples from Table 6.

TABLE 7

| Sample | Firmness (Force in g) | Viscosity (Pa*s at 60$^{-1}$) |
| --- | --- | --- |
| 1 | 24.8 | 0.17 |
| 2 | 63.6 | 0.50 |
| 3 | 65.2 | 0.50 |
| 4 | 96.4 | 0.94 |
| 5 | 76.4 | 0.59 |
| 6 | 114.5 | 1.23 |

Heat treatment at 70° C. without homogenization resulted in a gel with low texture and viscosity, as observed in Example 1. However, homogenization at either 100 bar or 250 bar following heat treatment at 70° C. resulted in an increase in both firmness and viscosity to levels above 40 g and 0.40 Pa*s at 60$^{-1}$, respectively. Further increases in both firmness and viscosity were observed if a sample was heat treated at 70° C., followed by homogenization at 250 bar, followed by a further heat treatment at 110° C. In contrast, homogenization following a heat treatment at 110° C. resulted in a slight decrease in both firmness and viscosity. However, firmness and viscosity were still acceptable.

Upon tasting the homogenized samples, it was observed that homogenization after heat treatment reduced the smoothness of the fermented product, with a more grainy texture. Homogenization prior to heat treatment imparted a more bitter flavor and a sandy texture. It is noted that these observations refer only to samples that do not contain a non-dairy milk product.

Example 5—Effects of Pea Protein Sources on Fermented Base

Various pea protein sources were tested in production of a fermented base. Table 8 shows tested pea protein sources and manufacturers. Each pea protein source was diluted in hot water (about 50° C.), and combined with sucrose to produce mixtures containing 4% pea protein and 3% sucrose. Samples of the mixture heat treated at 110° C. for 15 minutes to form thermally treated mixtures. The thermally treated mixtures were fermented at 43° C. with Yo-Mix 433. Firmness and viscosity of each resulting non-dairy fermented food product was measured as described above.

TABLE 8

| Pea protein source | Pea protein content (% by weight) | Time to pH 4.55 | Firmness (Force in g) | Viscosity (Pa*s at 60$^{-1}$) |
| --- | --- | --- | --- | --- |
| NUTRALYS® F85F | 80 | 6 | 73.0 | 0.81 |
| Empro E86HV | 82.5 | 24 | 59.9 | 0.55 |
| PURIS™ Pea 870 | 78.64 | 5.6 | 57.0 | 0.76 |

TABLE 8-continued

| Pea protein source | Pea protein content (% by weight) | Time to pH 4.55 | Firmness (Force in g) | Viscosity (Pa*s at $60^{-1}$) |
|---|---|---|---|---|
| PURIS ™ Pea 870H | 79.9 | 15.5 | 13.6 | 0.01 |

As indicated in Table 8, all of the pea protein sources could be fermented to a pH of 4.55. However, PURIS™ Pea 870H did not produce a gel upon fermentation. Without being bound by theory, it is believed that the hydrolyzation level of the protein PURIS™ Pea 870H is too high to produce a strong gel. It is believed that lower levels of pea protein hydrolyzation may still be able to produce a gel, however.

It's noted that, although the Empro E86HV pea protein took 24 hours to reach a pH of 4.55 using the Yo-Mix 433 culture, it took only 5.5 hours to reach the same pH if a different culture was used, containing a combination of strains of *Streptococcus thermophilus*, *Lactobacillus delbrueckii bulgaricus*, *Lactobacillus acidophilus*, and *Bifidobacterium animalis lactis*.

Colorimetry was also performed, as described in Example 1. The results are shown in Table 9 below. ΔE compares each sample to the NUTRALYS F85F sample.

TABLE 9

| Pea protein source | L* (D65) | a* (D65) | b* (D65) | ΔE |
|---|---|---|---|---|
| NUTRALYS ® F85F | 79.62 | 1.78 | 12.44 | 0 |
| Empro E86HV | 91.33 | -2.37 | 12.46 | 12.42 |
| PURIS ™ Pea 870 | 78.53 | 1.05 | 12.62 | 1.33 |
| PURIS ™ Pea 870H | 91.23 | -2.92 | 12.81 | 12.52 |

Although the PURIS™ Pea 870 sample has similar colorimetry values to the NUTRALYS® F85F sample, the appearance seemed more neutral than NUTRALYS® F85F, which presented with a more caramel-like color.

Upon tasting each sample, the NUTRALYS® F85F and PURIS™ Pea 870 samples had the more preferred flavor, with the PURIS™ Pea 870 being most preferred.

Example 6—Effects of Lactic Acid Bacteria Cultures on Fermented Base

Various lactic acid bacterial cultures were tested in production of a fermented base. A thermally treated mixture was prepared using a NUTRALYS® F85F (corresponding to 4% pea protein concentration) and 3% sucrose mixture that was treated at 110° C. for 15 minutes. Samples of the thermally treated mixture were fermented with lactic acid bacterial cultures, at temperatures ranging from about 35° C. to about 43° C.

The results showed that Yo-Mix 433, and cultures containing strains of *Streptococcus thermophilus* and *Lactobacillus delbrueckii bulgaricus*, with or without additional lactic acid bacteria species (e.g., *Lactobacillus* species, *Pediococcus* species, and/or *Bifidobacterium* species), or cultures containing a *Weissela* species, were able to produce a smooth, shiny gel. Additional cultures containing strains of one or both of *Streptococcus thermophilus* and *Lactobacillus delbrueckii* (*bulgaricus* or *lactis*), with or without additional lactic acid bacteria species (e.g., *Lactobacillus* species, *Pediococcus* species, and/or *Bifidobacterium* species), also produced a gel, but the texture was less smooth. Thus, it can be seen that a wide variety of cultures can be used to produce a non-dairy fermented food product. Preferred cultures produce a smooth, shiny gel with low bitterness.

Example 7—Inclusion of Additional Ingredients in Fermented Base

Non-dairy milk products and an oat fiber source were added to pea protein (NUTRALYS® F85F) and sugar (included at 3% by weight, except for samples containing oat milk, which contain sugar added at 2% by weight) prior to heat treatment and fermentation using Yo-Mix 433 to assess the effect of additional ingredients on the resulting non-dairy fermented food product. The amount of pea protein and non-dairy milk product were adjusted to target a total protein content of 5% of the mixture, with the protein concentration by weight of almond milk being 4%, coconut milk being 0.7%, oat milk being 1.6%, and NUTRALYS® F85F being 80%. Each of the mixture compositions in Table 10 was heated at 110° C. for 15 minutes. The samples containing oat fiber were homogenized at 250 bar prior to heat treatment.

TABLE 10

| Sample | NUTRALYS ® F85F content | Non-dairy Milk product (content) | Oat fiber content |
|---|---|---|---|
| A | 4.84% | Almond (28.2%) | 0% |
| B | 4.84% | Almond (28.2%) | 3% |
| C | 5.99% | Coconut (30.3%) | 0% |
| D | 5.99% | Coconut (30.3%) | 3% |
| E | 5.8% | Oat (22.7%) | 0% |
| F | 5.8% | Oat (22.7%) | 3% |

Firmness was measured on the fermented products from the mixtures in Table 10 as described above, and are provided in Table 11.

TABLE 11

| Sample | Firmness (Force in g) |
|---|---|
| A | 153.5 |
| B | 189.8 |
| C | 151.6 |
| D | 263.0 |
| E | 73.7 |
| F | 158.7 |

Upon tasting the samples from Tables 10 and 11, it was found that all the samples produced fermented products with satisfactory texture. Addition of fiber increased firmness in each case. Additional samples containing non-dairy milk product, but no pea protein did not gel upon fermentation.

Upon tasting, it was noted that fiber increased astringent notes in the flavor. It is unclear whether the astringency was from the fiber or from homogenization, as noted in Example 4. Pea flavor in each sample was reduced compared to samples that contained no non-dairy milk product, with the oat milk product being the most preferred.

Additional experiments with non-dairy milk products, an oat fiber source, and fat (from dairy cream) were done to assess the effects on a non-dairy fermented food product. The additional ingredients were added to pea protein (NUTRALYS® F85F) and sugar (included at 2% or 3% by weight, as indicated) as shown in Table 13 prior to heat treatment and fermentation using Yo-Mix 433. Each of the mixture compositions in Table 12 was heated at 110° C. for 15 minutes. Samples K and M were homogenized at 250 bar prior to heat treatment. Sample L was homogenized at 100 bar prior to heat treatment.

TABLE 12

| Sample | Pea protein content | Oat milk content | Cream content | Fat content | Oat fiber content | Sugar content |
|---|---|---|---|---|---|---|
| G | 5% | | | | | 3% |
| I | 5% | 22.8% | | 2.9% | | 2% |
| J | 5% | 22.8% | | 2.9% | 1.5% | 2% |
| K | 5% | | 3% | 3% | | 3% |
| L | 5% | | 9% | 9% | | 3% |
| M | 5% | | 9% | 9% | | 3% |

Each fermented food product made from the mixture compositions in Table 12 was tested for firmness and viscosity and water holding capacity (Table 13), colorimetry (Table 14), and particle size (Table 15) as described previously. Firmness and viscosity were measured at 1 day after fermentation and 7 days after fermentation. Particle size was measured prior to heat treatment and following heat treatment, and samples including fat (Samples I-M) were treated with SDS to reduce protein/fat interactions. Pea protein appears to contribute a majority of texture, though other ingredients (e.g., fiber, fat, and non-dairy milk product) can contribute to texture, as is seen in Tables 11 and 13-14.

TABLE 13

| Sample | Firmness (Force in g) | | Viscosity (Pa*s at 60⁻¹) | | Water holding capacity (%) |
|---|---|---|---|---|---|
| | Day 1 | Day 7 | Day 1 | Day 7 | |
| G | 51.0 | 57.5 | 0.54 | 0.51 | 27 |
| I | 43.7 | 51.3 | 0.60 | 0.55 | 36 |
| J | 68.0 | 80.9 | 0.75 | 0.74 | 46.5 |
| K | 79.6 | 87.4 | 0.60 | 0.62 | 35.5 |
| L | 55.4 | 62.8 | 0.43 | 0.43 | 38 |
| M | 157.1 | 183.1 | 0.96 | 0.91 | 54.5 |

As can be seen in Table 13, all the samples formed sufficient gel. Samples containing fiber or fat (e.g., Samples J-M), showed higher firmness and viscosity values.

TABLE 14

| Sample | L* (D65) | a* (D65) | b* (D65) | ΔE |
|---|---|---|---|---|
| G | 81.44 | 2.71 | 13.02 | 0 |
| I | 76.65 | 4.52 | 20.13 | 8.76 |
| J | 79.85 | 2.96 | 16.09 | 3.47 |
| K | 84.93 | 2.13 | 12.09 | 3.66 |
| L | 87.42 | 1.59 | 11.49 | 6.27 |
| M | 87.82 | 1.46 | 10.76 | 6.88 |

As can be seen in Table 14, compared to Sample G, samples containing fat (Samples K, L, and M) had a higher brightness, while samples containing oat milk (Samples I and J) had a lower brightness. However, as fiber was added, brightness increased.

TABLE 15

| Sample | Average particle size before heat treatment (μm) | Average particle size after heat treatment (μm) |
|---|---|---|
| G | 25.2 | 41.0 |
| I | 68.9 | 12.9 |
| J | 37.9 | 22.8 |
| K | 45.8 | 15.0 |
| L | 32.6 | 17.6 |
| M | 32.6 | 4.7 |

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making a non-dairy fermented food product having less than 0.01% by weight added stabilizers, the non-dairy fermented food product having a viscosity of at least 0.4 Pa*s at 60 s⁻¹ at 10° C., a firmness of at least 40 g at 10° C., and a pea protein content of from about 3% to about 12% by weight, the method comprising:
   a. providing a liquid mixture that includes pea protein and sugar, the liquid mixture having a pea protein content of from about 3% to 12% by weight;
   b. heating the liquid mixture to a temperature and for a time sufficient to produce a thermally treated mixture, wherein the liquid mixture is heated so that the temperature is from about 90° C. to about 120° C. and the time is from at least 30 seconds to about 30 minutes;
   c. inoculating the thermally treated mixture with a lactic acid bacterial culture; and
   d. fermenting the thermally treated mixture until a pH of less than about 4.7 is reached to form the fermented food product.

2. The method of claim 1, wherein the method further comprises homogenizing following the heating and prior to the inoculating.

3. The method of claim 1, wherein the liquid mixture further comprises a non-dairy milk product.

4. The method of claim 3, wherein the non-dairy milk product is an oat milk product, an almond milk product, or a coconut milk product.

5. The method of claim 4, wherein the liquid mixture comprises non-dairy milk product in an amount of up to 60% by weight.

6. The method of claim 1, wherein the liquid mixture further comprises sugar in an amount of from 0.5% to 10% by weight.

7. The method of claim 1, wherein the lactic acid bacterial culture comprises one or more of *Streptococcus thennophilus, Lactobacillus delbrueckii bulgaricus, Lactobacillus acidophilus, Bifidobacterium animalis lactis*, and *Weissella cibaria*.

8. The method of claim 7, wherein the lactic acid bacterial culture comprises *Streptococcus thennophilus* and *Lactobacillus delbrueckii bulgaricus*.

9. The method of claim 1, wherein the liquid mixture comprises a fiber ingredient in an amount of up to 3% by weight.

10. The method of claim 9, wherein the fiber ingredient is an oat fiber ingredient.

11. The method of claim 1, wherein the liquid mixture comprises fat in an amount of up to 15% by weight.

12. A method of making a non-dairy fermented food product having less than 0.01% by weight added stabilizers, the non-dairy fermented food product having a viscosity of at least 0.4 Pa*s at 60 s$^{-1}$ at 10° C., a firmness of at least 40 g at 10° C., and a pea protein content of from about 3% to about 12% by weight, the method comprising:
- a. providing a liquid mixture that includes pea protein and sugar, the liquid mixture having a pea protein content of from about 3% to 12% by weight;
- b. homogenizing the liquid mixture at a pressure of from about 100 bar to about 250 bar;
- c. before or after the homogenizing, heating the liquid mixture to a temperature and for a time sufficient to produce a thermally treated mixture, wherein the liquid mixture is heated so that the temperature is from about 65° C. to about 120° C. and the time is from about 1 minute to about 30 minutes;
- d. inoculating the thermally treated mixture with a lactic acid bacterial culture; and
- e. fermenting the thermally treated mixture until a pH of less than about 4.7 is reached to form the fermented food product.

\* \* \* \* \*